United States Patent [19]

McAllister et al.

[11] 3,932,732

[45] Jan. 13, 1976

[54] KEYED CONTROL DEVICE FOR MACHINES AND OTHER INSTRUMENTALITIES

[76] Inventors: Wayne D. McAllister, 695 Bush Garden Drive, Pasadena, Calif. 91105; Louis S. Polster, 28034 Cero Drive, Saugus, Calif. 91335

[22] Filed: Aug. 14, 1972

[21] Appl. No.: 280,504

Related U.S. Application Data

[63] Continuation of Ser. No. 75,166, Sept. 24, 1970, abandoned.

[52] U.S. Cl. .... 235/92 CT; 235/92 PD; 235/92 AC; 235/92 R
[51] Int. Cl.² .......................................... G06M 3/02
[58] Field of Search ........ 235/92 PD, 92 FP, 92 PE, 235/92 CT, 92 FL, 92 AC, 132, 61.8 A; 200/42; 324/94; 222/2

[56] References Cited
UNITED STATES PATENTS

| | | | |
|---|---|---|---|
| 3,287,543 | 11/1966 | Halpern | 235/61.8 A |
| 3,356,021 | 12/1967 | May et al. | 235/61.8 A |
| 3,436,530 | 4/1969 | Faude et al. | 235/92 |
| 3,500,342 | 3/1970 | Bissett et al. | 324/94 |
| 3,560,715 | 2/1971 | Hiroo Akamatsu et al. | 235/61.8 A |
| 3,670,924 | 6/1972 | Asper | 222/2 |

*Primary Examiner*—Joseph M. Thesz, Jr.
*Attorney, Agent, or Firm*—Whann & McManigal

[57] ABSTRACT

A keyed control device arranged to measure and control an operating characteristic of a machine or other instrumentality, and at a predetermined measurement of the operating characteristic will function to control the energization of means for interrupting an established control circuit to the machine or instrumentality. The control device includes a plug-in keying unit which limits use of the machine or instrumentality to authorized personnel. The keying unit may contain means for either or both visually and non-visually measuring the operating characteristic of the machine or instrumentality, such as a counter of signal impulses representative of the machine or instrumentality productivity. Upon reaching a predetermined number of operations, means are energizable through suitable control devices to shut down or terminate an operating characteristic of the machine or the instrumentality until such time as the authorized keying unit is replaced by another unit which is preset to permit delivery of the predetermined number of machine or instrumentality operations, or by "recharging" the "discharged" keying unit to a predetermined capacity of deliverable operations.

5 Claims, 2 Drawing Figures

WAYNE D. McALLISTER
LOUIS S. POLSTER
INVENTORS.
WHANN & McMANIGAL
Attorneys for Applicants
BY

KEYED CONTROL DEVICE FOR MACHINES AND OTHER INSTRUMENTALITIES

This application is a continuation of our application Ser. No. 75,166, filed Sept. 24, 1970, now abandoned.

BACKGROUND OF THE INVENTION

The present invention relates generally to the field of electric control devices.

Control devices of a somewhat similar character to that of the present invention have heretofore been generally known from U.S. Letters Pat. No. 3,436,530, issued Apr. 1, 1969; and the present invention constitutes an improvement over the control device of this patent, and includes unique and improved features of operation which expand the scope of usefulness into fields wherein control devices such as shown in the above mentioned patent cannot be used.

Briefly, the above noted patent is directed to a control device for preventing unauthorized use of a machine and contains a key-counter unit having operation counter means therein and which will form an electronic interlocked circuit which is designed to operate as a key, when plugged into the control device, to permit use of the machine by authorized personnel, and which will count or register in the key-counter the number of operations performed and chargeable to the holder of the particular key-counter.

The present invention provides an improved concept which overcomes and solves certain problems which are inherent in the key-counter such as conventionally known according to the above noted patent. One of the disadvantages of the conventional key-counter is that if it should become lost or surreptitiously acquired, the unit could be used by unauthorized personnel to obtain unauthorized productive use of the machine. In the present invention, this possibility is minimized to the extent that should a key-counter be used by unauthorized personnel, it could be used only for obtaining a limited number of productive operations of the machine or instrumentality. For this purpose, there is provided in the key-counter unit, which may be in addition to the usual counter, a measuring device which will function to measure the machine operations, and which may be "charged" or preset for a predetermined number of operations, and when the set number of operations have been used will function in a manner to terminate the machine operation and will render the key-counter ineffective for further use. A keycounter which has thus been discharged by virtue of having used it to obtain the preset number of operations may either be recharged for the required number of operations or may be replaced by another fully charged unit.

It will thus be appreciated that if a key-counter having this improved concept were lost, it could only be used to obtain a limited number of operations of the machine.

SUMMARY OF THE INVENTION

The present invention relates generally to control devices, and is more particularly concerned with improved control devices for machines and other instrumentalities in which a main control unit incorporates an auxiliary "keying unit" for the use of authorized persons only, and which provides unique means in the keying unit for measuring the extent of use of the machine or instrumentality in the performance of an operation, as well as means for predetermining the number of performance operations to which the authorized person is entitled before the keying unit has to be recharged or replaced by a fully charged unit.

It is, therefore, one object of the present invention to provide a novel control device for machines and instrumentalities, with an improved auxiliary keying unit permitting use of the machine or instrumentality only by persons having the appropriate keying unit.

A further object is to provide control means having a keying unit with measuring means which can be charged to permit a predetermined measured use of an operating characteristic of the machine or instrumentality, and after the measured usage must be either recharged or replaced by a charged unit.

It is also an object of the herein described invention to provide an electric interlocking keying unit in which the measuring means provides a storage for sensed machine operations, and which may later be ascertained by known readout procedures.

Still another object is to provide a keying unit having measuring means therein which may be present to trigger associated electronic switching means at a predetermined measurement level.

Further objects and advantages of the invention will be brought out in the following part of the specification, wherein detailed description is for the purpose of fully disclosing several embodiments of the invention without placing limitations thereon.

BRIEF DESCRIPTION OF THE DRAWINGS

Referring to the accompanying drawings, which are for illustrative purposes only.

DESCRIPTION OF THE SEVERAL EMBODIMENTS

Figure 1:
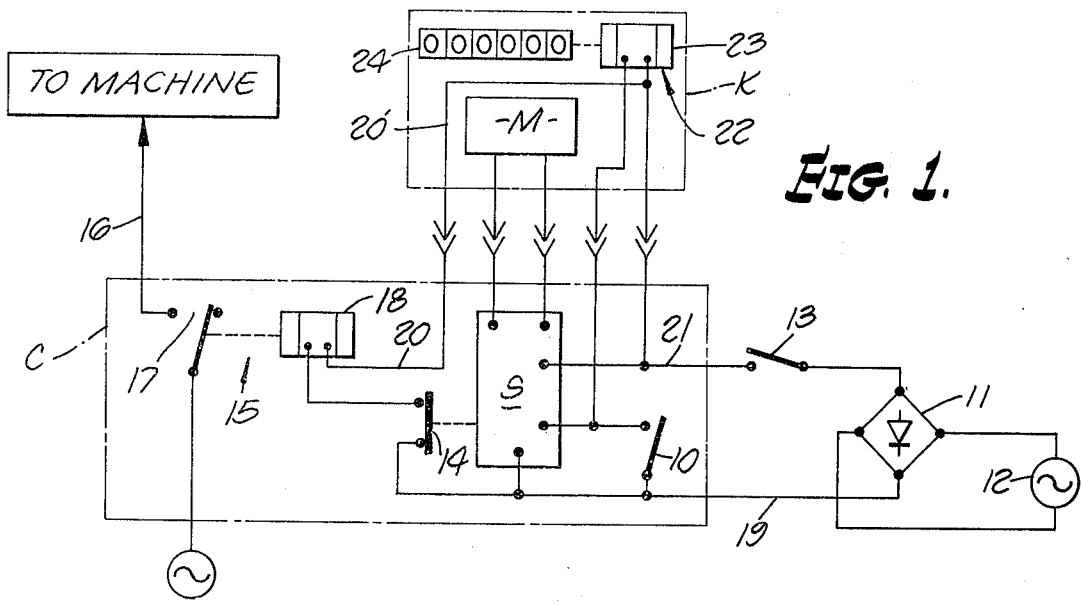
FIG. 1 is a schematic wiring diagram with portions diagrammatically illustrated, and showing the circuitry of a control device and auxiliary keying unit, according to the broad concepts of the invention.

Referring more specifically to the drawings, for illustrative purposes, the invention in its broad concept is shown in FIG. 1 as applied generally for the control of machines or other instrumentalities where it is desirous of limiting the control of a particular machine or instrumentality operation to certain authorized persons.

For this purpose, a composite control device is provided with a main control unit C and an auxiliary keying unit K of the plug-in type so as to readily permit interconnection of the control circuitry between the main control unit and the auxiliary keying unit.

An important feature of the invention is that the control device utilizes sensing and control means S located in the main control unit, and interconnected measuring means M located in the auxiliary keying unit. The sensing and control means and measuring means cooperate to sense the desired characteristic of a machine or instrumentality which is to be measured, recorded or otherwise used as a criteria for determining control of the machine characteristic, and upon reaching a predetermined condition coact with the sensing means to modify a control circuit to the machine or instrumentality in such a manner as to effect a desired control operation with respect to the continued production of the machine or instrumentality characteristic.

The sensing means S and its control components are compatible with the particular characteristic of the machine or instrumentality which is to be measured, recorded or otherwise handled by the measuring means M. In the broad concept, the machine or instrumentality characteristics may comprise any of the conventional signal producing media such as time, current, voltage and the like and may be of pulsed or continuous nature depending upon the particular components which are utilized.

As exemplary, if it be assumed that the machine or instrumentality is to be controlled with respect to an operating characteristic which is indicated by the transmission of pulses, such pulses may be created locally at the machine or instrumentality or at the control device by a switch means as generally indicated at 10 and arranged to be electrically or mechanically motivated by the machine or instrumentality operation. As shown, this switch is used to control a pulsing circuit in which a direct current pulse would be transmitted from a connected direct current supply source such as a diode bridge rectifier 11 having its input connected with an alternating current source 12 and its output connected through a main control switch 13 to terminal connectors of the sensing and control means S.

The generated pulses are sensed by the sensing and control means S and are also transmitted to the measuring means M which will comprise an appropriate device which will operate after receiving a predetermined number of pulses for which it may be preset to coact through the sensing and control means S to open normally closed contacts of a switch 14 in the control circuit of a relay as generally indicated at 15.

The relay 15 is utilized to establish and interrupt a control circuit 16 to the machine or instrumentality for controlling through suitable means the characteristic which is being measured. In the case of a machine which is being controlled with respect to its productivity, this circuit may be utilized to interrupt the further operation of the machine. The relay 15 has normally open contacts 17 which are arranged to be closed upon energization of an actuating coil 18 through the following circuit: From one side of the rectifier 11 through a conductor 19, switch contacts 14 to one terminal of the coil 18, from the other terminal of the coil through a conductor 20 to a conductor 21, and thence through the main control switch 13 to the other side of the rectifier 11. It will be observed that the conductor 20 includes a section 20' which is contained within the auxiliary keying unit K. Thus, the keying unit K must necessarily be plugged in to its connected position with the main control unit, before it is possible to energize the actuating coil 18 and close the switch contacts 17 to establish the control circuit 16. In this manner, the auxiliary keying unit becomes a key which permits the operation of the machine or instrumentality for the carrying out of a particular desired characteristic thereof by such personnel as may have the keying unit in its possession.

In addition to the control of the machine or instrumentality for a limited number of operations by means of the measuring means M, it may also be desirable to visually indicate the times of machine operation, and for this purpose there is provided a conventional pulse counter 22 in which an actuating coil 23 is arranged to motivate a visual register 24 upon the energization of the actuating coil. The control circuit for the actuating coil 23 is connected with the pulsing circuit controlled by switch 10 so that each time a pulse is transmitted, the pulse counter 22 will record it. It is thus possible for the user of the auxiliary keying unit to know at all times the number of operations of the machine for which he is responsible.

Figure 2:
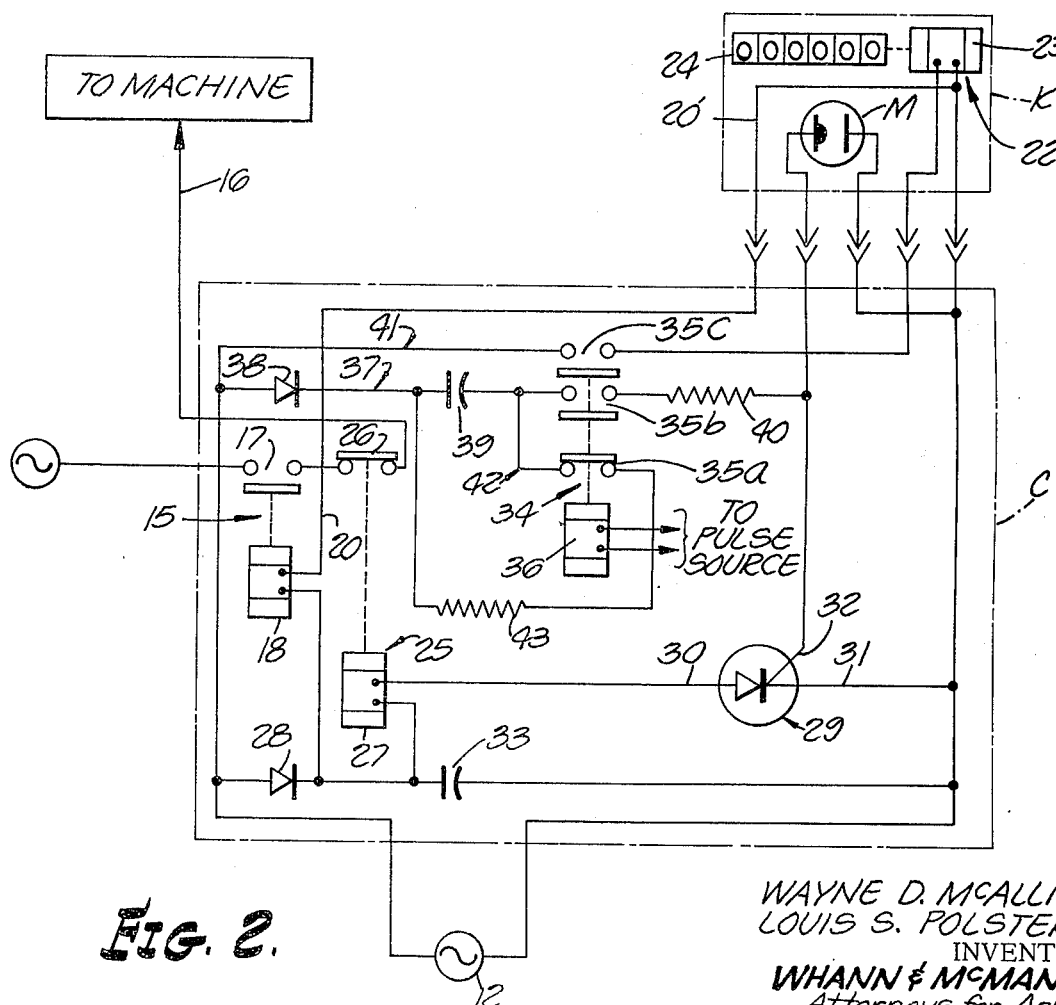
FIG. 2 is a similar view in which the circuitry of a control device particularly for use with a machine has been shown in greater detail.

Referring to FIG. 2, an embodiment of the control device according to the present invention will now be explained in respect to a specific sensing and control means S and associated measuring means M which have been utilized for carrying out the broad concepts of the invention. In this embodiment, the measuring means M is disclosed as comprising a device which is sold under the name E-CELL (Trade-Mark) by the The Bissett-Berman Corporation. Briefly, this device is electrochemical in its action and has the ability to operate as a storage device as well as permit readout of the storage. As used in the present invention, the device can be preset or charged with a predetermined number of pulses and during use of the control device of the present invention these pulses will be successively removed each time the machine is operated. It is a characteristic of the device that in the charged position, it has a low resistance and when discharged acquires a relatively high resistance. Advantage is taken of this operating characteristic of the device to control through sensing and control means S, the control circuit 16.

As shown in FIG. 2, the control circuit 16 is in addition to the relay 15 provided with a second control relay 25 having normally closed contacts 26 which are actuatable to open position upon energization of the relay actuating coil 27 having a control circuit connected with a direct current source supplied by a rectifying diode 28. The control circuit for the relay 25 actuating coil is under the control of electronic switching means which are shown as comprising a silicon-controlled rectifier 29 having the conventional anode electrode 30, cathode electrode 31 and gating electrode 32. A capacitor 33 is provided in a circuit extending from the anode 30 to the cathode 31 of the controlled rectifier, this circuit also including the actuating coil 27 of the relay 25. This capacitor operates to retain the controlled rectifier in a conducting mode once it has been triggered, and also prevents chattering fluctuations.

In this embodiment, the sensing and control means S are provided with a sensing relay 34 having normally closed contacts 35a, normally open contacts 35b and normally open contacts 35c, which are operable in response to the energization and deenergization of an actuating coil 36. This relay coil is controlled through a circuit connected with a pulse source which is responsive to machine operations.

Triggering control of the controlled rectifier 29 is obtained from a pulsed circuit 37 which is connected to a direct current source provided by a rectifying diode 38. The pulsed circuit 37 contains a capacitor 39, the normally open contacts 35b, a resistor 40 and the measuring means M.

A second pulsed circuit 41 is connected to the alternating current source 12 and contains the normally open contacts 35c and the actuating coil 23 of the pulse counter 22.

A discharge circuit 42 is connected between the terminals of the capacitor 39 and contains the normally closed contacts 35a and a discharge resistor 43.

Considering now the operation of the control device as shown in FIG. 2, it will be apparent that when the auxiliary keying unit K is plugged into the main control unit C, the conductor section 20' will complete a circuit for the energization of the actuating coil 18 of relay 15, and that this relay will close its contacts 17 to complete and establish a control circuit to the machine through the normally closed contacts 26 of relay 25. Each time a pulse is received by the actuating coil 36 of the sensing relay 34, this relay will be actuated to close its contacts 35c and energize the pulse counter 22 to record the pulse.

Simultaneously, the contacts 35b will be closed and thereby complete the circuit 37. The capacitor 39, which has previously been discharged through the discharge circuit 42, will now be charged to maximum line voltage within a few cycles, the current being limited only by the resistor 40. The charging current of the capacitor 39 also flows through the measuring means M, in this case the E-CELL to remove one of the preset charges therefrom. The measuring means M during a charged condition provides in effect a short circuit between the cathode electrode 31 and gating electrode 32 of the controlled rectifier 29, and under such circumstances is prevented from triggering into a conducting mode. When the pre-charged number of pulses in the measuring means M have been acquired by the successive operations of the machine, the device M, due to its operating characteristics presents a high resistance between the electrodes 31 and 32 and a consequent voltage is thus produced which will trigger the controlled rectifier into conductivity. The actuating coil 27 of the relay 25 will now be energized to open contacts 26 and interrupt the circuit 16. The particular auxiliary keying unit K having now been discharged, the unit cannot be further used until the measuring means M therein is either recharged, or exchanged for a new fully charged keying unit.

From the foregoing description and drawings, it will be clearly evident that the delineated objects and features of the invention will be accomplished.

Various modifications may suggest themselves to those skilled in the art without departing from the spirit of the invention, and, hence, it is not wished to be restricted to the specific forms shown or uses mentioned, except to the extent indicated in the appended claims.

We claim:

1. A control device for preventing the unauthorized use of an instrumentality in the performance of an operation, which comprises:
   a. a main control unit, and a portable manually electrically connectable and disconnectable auxiliary keying unit for normally activating and deactivating first means for establishing and interrupting an operation control circuit to said instrumentality; and
   b. control means having components for sensing and measuring an operating characteristic of said instrumentality;
   c. said measuring component being incorporated within said keying unit and being electrically activated, means to pre-set the measuring component to a predetermined measurement, said measuring component upon attaining said pre-set measurement being operable to energize said first means so as to interrupt the established control circuit to said instrumentality, and said measuring component comprising an electrochemically activated device.

2. A control device according to claim 1, wherein said activated device is connected to a pulsing circuit.

3. A control device for preventing the unauthorized use of a machine in the performance of an operation, which comprises:
   a. a main control unit, and a portable manually electrically connectable and disconnectable auxiliary keying unit for normally activating and deactivating means for establishing and interrupting an operation control circuit to said machine;
   b. control means including sensing means located in said main control unit, for sensing an operating characteristic of said machine, and electrically activated measuring means located in said keying unit for measuring said sensed characteristic, means to pre-set the measuring means to a predetermined measurement; and
   c. overriding control operable in response to said measuring means attaining said pre-set measurement for interrupting the control circuit to machine as established by the main control unit;
   d. said means for interrupting the established control circuit comprises switching means coupled with an energizing circuit, said energizing circuit including electronic switching means;
   e. said electronic switching means comprises a silicon-controlled rectifier having anode and cathode electrodes connected in said energizing circuit; and said measuring means forms an element of a voltage divider circuit and is connected between the cathode and gating electrodes of said rectifier.

4. A control device according to claim 3, including a circuit between the anode and cathode electrodes of said silicon-controlled rectifier, said circuit having a capacitor element therein.

5. A control device for preventing the unauthorized use of a machine in the performance of an operation, which comprises:
   a. a main control unit; a portable manually electrically connectable and disconnectable auxiliary keying unit for normally activating and deactivating means in the main control unit for establishing and interrupting an operation control circuit to said machine;
   b. control means including sensing means located in said main control unit, for sensing an operating characteristic of said machine, and electrically activated measuring means comprising an electrochemical device located in said keying unit for measuring said sensed characteristic, means to pre-set the measuring means to a predetermined measurement; and
   c. overriding control operable in response to said measuring means attaining said pre-set measurement for interrupting the control circuit to said machine as established by the main control unit.

* * * * *